US007921235B2

(12) United States Patent
Best et al.

(10) Patent No.: US 7,921,235 B2
(45) Date of Patent: Apr. 5, 2011

(54) IDENTIFYING A CABLE WITH A CONNECTION LOCATION

(75) Inventors: Steven Francis Best, Georgetown, TX (US); Robert James Eggers, Jr., Austin, TX (US); Janice Marie Girouard, Austin, TX (US); Craig Anthony Klein, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 12/431,374

(22) Filed: Apr. 28, 2009

(65) Prior Publication Data

US 2009/0204729 A1 Aug. 13, 2009

Related U.S. Application Data

(63) Continuation of application No. 11/564,872, filed on Nov. 30, 2006, now Pat. No. 7,526,582.

(51) Int. Cl.
*G06F 3/00* (2006.01)
*G06F 13/12* (2006.01)

(52) U.S. Cl. ............................ 710/15; 710/72; 439/488

(58) Field of Classification Search .............. 710/15–19, 710/72–74; 439/488–492; 235/375; 700/115, 700/215; 709/220
See application file for complete search history.

(56) References Cited

U.S. PATENT DOCUMENTS

| | | | | |
|---|---|---|---|---|
| 4,938,712 | A | 7/1990 | Black | |
| 6,076,142 | A | 6/2000 | Corrington et al. | |
| 6,530,085 | B1 | 3/2003 | Perlman | |
| 6,684,347 | B1 | 1/2004 | Coffey | |
| 6,691,188 | B2 | 2/2004 | Bae | |
| 6,808,116 | B1 | 10/2004 | Eslambolchi et al. | |
| 6,847,856 | B1 | 1/2005 | Bohannon | |
| 6,861,585 | B1 | 3/2005 | Kiely | |
| 6,968,994 | B1 | 11/2005 | Smith | |
| 6,975,242 | B2 | 12/2005 | Dannenmann et al. | |
| 7,014,500 | B2 | 3/2006 | Belesimo | |
| 7,170,393 | B2 * | 1/2007 | Martin | 340/10.1 |
| 7,374,101 | B2 * | 5/2008 | Kaneko | 235/492 |
| 7,436,310 | B2 * | 10/2008 | Flaster et al. | 340/572.8 |
| 2003/0018756 | A1 | 1/2003 | Nguyen et al. | |
| 2003/0021580 | A1 | 1/2003 | Matthews | |
| 2005/0215110 | A1 | 9/2005 | Chen | |
| 2005/0215119 | A1 * | 9/2005 | Kaneko | 439/607 |
| 2005/0219050 | A1 * | 10/2005 | Martin | 340/572.1 |
| 2007/0078975 | A1 | 4/2007 | LeMay et al. | |
| 2007/0236355 | A1 * | 10/2007 | Flaster et al. | 340/572.8 |
| 2007/0247284 | A1 * | 10/2007 | Martin et al. | 340/10.1 |

FOREIGN PATENT DOCUMENTS

| | | |
|---|---|---|
| JP | 2005339983 | 8/2005 |

* cited by examiner

*Primary Examiner* — Christopher B Shin
(74) *Attorney, Agent, or Firm* — Yee & Associates, P.C.; Steven L. Bennett

(57) ABSTRACT

The illustrative embodiments provide a cable management system, a computer program product, a cable, a method for manufacturing a cable, and a method for guiding a user in identifying a connection location for a cable of interest. A processor, in a data processing system, receives a cable identification from the cable of interest. The processor then matches at least one connection location with the cable of interest based on the cable identification. Responsive to matching the at least one connection location with the cable of interest, the processor activates an indicator that identifies the at least one connection location for connecting the cable of interest.

18 Claims, 4 Drawing Sheets

600

| | 610 | 620 | 630 |
|---|---|---|---|
| | CABLE IDENTIFICATION | CONNECTION LOCATION | INDICATOR |
| 640 | 1F | PRINTER | P2 |
| 642 | 2C | SPEAKERS | S9 |
| 644 | 4A | MOUSE | M1 |
| 646 | 4C | KEYBOARD | K3 |
| 648 | 7D | MONITOR | M4 |
| 650 | 3B | POWER | P4 |
| | ⋮ | ⋮ | ⋮ |

IDENTIFYING A CABLE WITH A CONNECTION LOCATION

This application is a continuation of application Ser. No. 11/564,872, filed Nov. 30, 2006, status: issued Apr. 28, 2009 as U.S. Pat. No. 7,526,582.

BACKGROUND OF THE INVENTION

1. Field of the Invention

The present invention relates generally to a cabling system. More particularly, the present invention relates to a method and apparatus for managing cables connected to a device.

2. Description of the Related Art

A typical electronic system, such as a computer or audio-visual system, has at least one if not multiple cables that connect to the electronic system. For users who are unfamiliar with the electronic system, connecting the correct cable to the correct location can be a daunting task. At times, the task becomes quite cumbersome as users sometimes must connect, disconnect, and reconnect the cables several times before the cables are connected correctly to the electronic system.

In the opposite situation, at times users are very familiar with the location to which a particular cable should connect; however, the user has a large quantity of cables that are connected to a large number of electronic systems. A large server bank is an example of such a system. Similar to the first situation in which a user is unfamiliar with an electronic system, the user who manages a large number of electronic systems often finds difficulty in determining which cable plugs into which location. The task is more confusing because of the number of cables involved in managing a large electronic system. Furthermore, often the cables visibly look the same and/or are of the same physical type, but the cables are designated to be plugged into different locations.

Several solutions currently exist to address the problem. One solution is to employ a color coding system in which a user matches a cable with a connector of the same color. However, in certain situations, not enough colors exist for the number of cables and cable connections. Additionally, some colors are difficult to distinguish from one another.

Another solution is to write the location of a connection on a label and then attach the label to the end of a cable. A corresponding label is placed on the connection location to identify the name of the connection location. The user then matches the location written on the label on the cable with the name of the connection location. However, connection locations are sometimes difficult to locate in systems with large numbers of electronic systems. Furthermore, the connection locations are often small and located in areas that are difficult for a user to read. Moreover, the labels are often not affixed very well and fall off easily. Furthermore, management of the labels can be cumbersome whenever a user decides to swap a particular electronic system with another electronic system or move a cable to another connection location. In such circumstances, a user may need to make new labels when the user swaps the electronic systems or moves the cable.

SUMMARY OF THE INVENTION

The illustrative embodiments provide a cable management system, a computer program product, a cable, a method for manufacturing a cable, and a method for guiding a user in identifying a connection location for a cable of interest. A processor, in a data processing system, receives a cable identification from the cable of interest. The processor then matches at least one connection location with the cable of interest based on the cable identification. Responsive to matching at least one connection location with the cable of interest, the processor activates an indicator that identifies the at least one connection location for connecting the cable of interest. In one embodiment, the indicator is a light emitting diode.

The at least one connection location can be stored in a first storage device in a first data processing system. The first storage device can transfer the at least one connection location to a second storage device in a second data processing system. The second storage device then identifies a corresponding connection location in the second data processing system. The corresponding connection location is a connection location similar to the at least one connection location.

Responsive to the cable of interest being connected to the at least one connection location, the processor identifies the at least one connection location as a last known good connection location. The processor then saves the last known good connection location with the cable identification in a storage device for use at a later time.

The processor can also receive a signal that the cable of interest is connected to another connection location. Responsive to the cable of interest being connected to another connection location, the processor identifies the another connection location as the last known good connection location.

In another embodiment, the at least one connection location is a plurality of connection locations. Each connection location in the plurality of connection locations corresponds to an indicator. Responsive to matching the cable of interest with the plurality of connection locations, the processor activates intermittently an indicator for the last known good connection location.

In the illustrative embodiments, the cable of interest transmits a radio frequency signal to the data processing system. The radio frequency signal communicates the cable identification for the cable of interest. In one embodiment, a passive transmitter coupled to the cable of interest transmits the radio frequency signal. In another embodiment, an active transponder coupled to the cable of interest transmits the radio frequency signal.

In one embodiment, the cable identification for the cable of interest includes a device identification. The device identification associates the cable of interest with a device. Only the device recognizes the cable identification from the cable of interest. In another embodiment, the cable identification for the cable can also include an identification of the type of cable. In yet another embodiment, the cable of interest may include a plurality of connectors. Each connector in the plurality of connectors transmits a corresponding cable identification. The processor activates a corresponding indicator for each connector. The corresponding indicator identifies the connection location for each connector.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
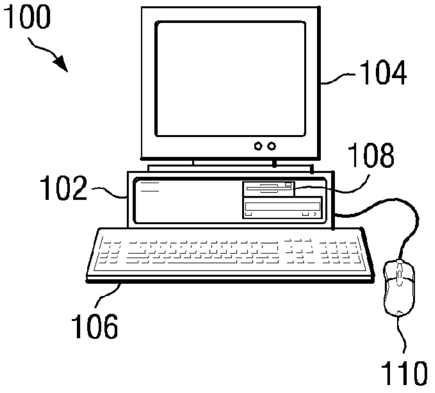
FIG. 1 illustrates a data processing system, in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, touchpad, touch screen, trackball, microphone, and the like.

Computer 100 may be any suitable computer, such as an IBM® eServer™ computer or IntelliStation® computer, each of which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
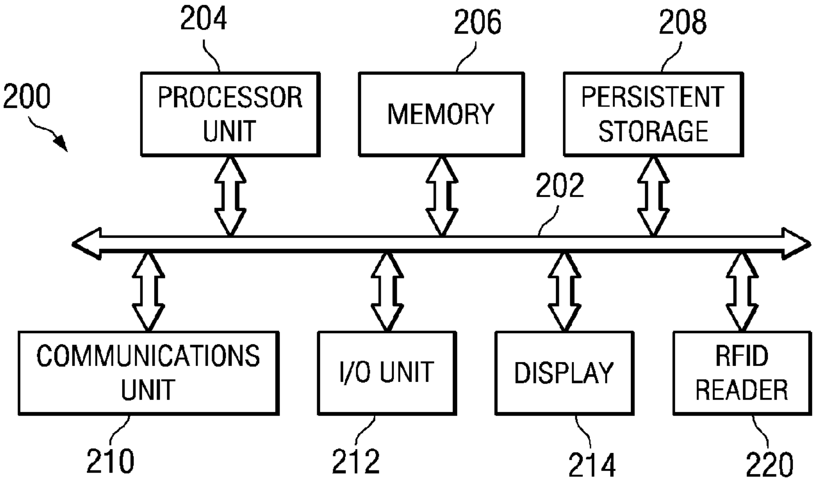
FIG. 2 is a block diagram of a data processing system, in which illustrative embodiments may be implemented.

Turning now to FIG. 2, a block diagram of a data processing system is depicted in accordance with an illustrative embodiment. In the illustrative embodiment, data processing system 200 is a computer, similar to computer 100 of FIG. 1. However, in another embodiment, data processing system 200 can be implemented in any device or system that utilizes a single cable or a number of cables, including but not limited to an audio-visual system, a medical device, or any combination thereof.

In yet another embodiment, data processing system 200 can also be a network of data processing systems. The network to which the data processing systems connect is a medium used to provide communication links between various devices and computers connected together. The network may include connections, such as wire, wireless communication links, or fiber optic cables. The network may also be the Internet, which is a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the network of data processing systems may be implemented as a number of different types of networks, such as for example, an intranet, a local area network (LAN), or a wide area network (WAN).

In the illustrative embodiment, data processing system 200 includes communications fabric 202. Communications fabric 202 provides communications between processor unit 204, memory 206, persistent storage 208, communications unit 210, I/O unit 212, display 214, and radio frequency identification (RFID) reader 220. Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip.

Memory 206, in these examples, may be, for example, a random access memory. Persistent storage 208 may take various forms depending on the particular implementation. For example, persistent storage 208 may be, for example, a hard drive, a flash memory, a rewritable optical disk, a rewritable magnetic tape, or some combination of the above.

Communications unit 210, in these examples, provides for communications with other data processing systems or devices. In these examples, communications unit 210 is a network interface card. I/O unit 212 allows for input and output of data with other devices that may be connected to data processing system 200. For example, in the illustrative embodiment, I/O unit 212 may provide a connection for a keyboard, mouse, printer, or speaker. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206.

RFID reader 220 reads signals transmitted using radio waves. In these examples, RFID reader 220 includes both a transmitter and a receiver enabling RFID reader 220 to both receive and transmit signals. Additionally, in these examples, RFID reader 220 forwards data in a received signal to processor unit 204.

Data processing system 200 is not limited to the depicted example. Depending on implementation, data processing system 200 may include more or fewer components and other architectural embodiments.

The illustrative embodiments provide a cable management system, a computer program product, a cable, a method for manufacturing a cable, and a method for guiding a user in identifying a connection location for a cable of interest. A processor, in a data processing system, receives a cable identification from the cable of interest. The processor is a processor unit and may be a set of one or more processors or may be a multi-processor core, depending on the particular implementation. The data processing system can be at least one of a computer, a system of computers, a network of computers, an audio-visual device, an audio-visual system, and a medical device. The processor then matches at least one connection location with the cable of interest based on the cable identification. In response to matching at least one connection location with the cable of interest, the processor activates an indicator that identifies the connection location for connecting the cable of interest. In one embodiment, the indicator is a light emitting diode.

In another embodiment, the first storage device can transfer the at least one connection location to a second storage device in a second data processing system. The second storage device then identifies a corresponding connection location in the second data processing system. The corresponding connection location is a connection location similar to the at least one connection location.

The processor can identify the at least one connection location as a last known good connection location in response to the cable of interest being connected to the at least one connection location. The processor then saves the last known good connection location with the cable identification in a storage device.

The processor in the data processing system can also receive a signal that the cable of interest is connected to another connection location. In response to the cable of interest being connected to another connection location, the processor identifies the another connection location as a last known good connection location. The processor then saves the last known good connection location with the cable identification in a first storage device for use at a later time.

In certain circumstances, the cable of interest matches with a number of connection locations. In such a situation, the processor for the data processing system activates all the indicators corresponding to all the connection locations with which the cable of interest can connect. However, the processor intermittently activates the indicator for the last known good connection location. Thus, if the indicator is a light emitting diode, the processor will make the indicator for the last known good connection location blink or flash intermittently.

In the illustrative embodiments, the cable of interest transmits a signal to the data processing system. The signal communicates the cable identification for the cable of interest. Additionally, the signal is typically a radio frequency signal. In one embodiment, a passive transponder coupled to the cable of interest transmits the radio frequency signal. In another embodiment, an active transponder coupled to the cable of interest transmits the radio frequency signal.

In a further embodiment, the cable identification for the cable of interest also includes a device identification. The device identification associates the cable of interest with a specific device. In this embodiment, only the specific device recognizes the cable identification for the cable of interest. In another embodiment, the cable identification for the cable of interest is an identification of the type of cable. Examples of types of cables include a printer cable, a mouse cable, or a speaker cable. In yet another embodiment, the cable of interest can include a plurality of connectors. Each connector of the plurality of connectors connects to a corresponding connection location. Thus, each of the connectors in the plurality of connectors transmits a corresponding cable identification. The processor then activates a corresponding indicator for each of the connectors. The corresponding indicator identifies the connection location for each of the connectors.

Figure 3:
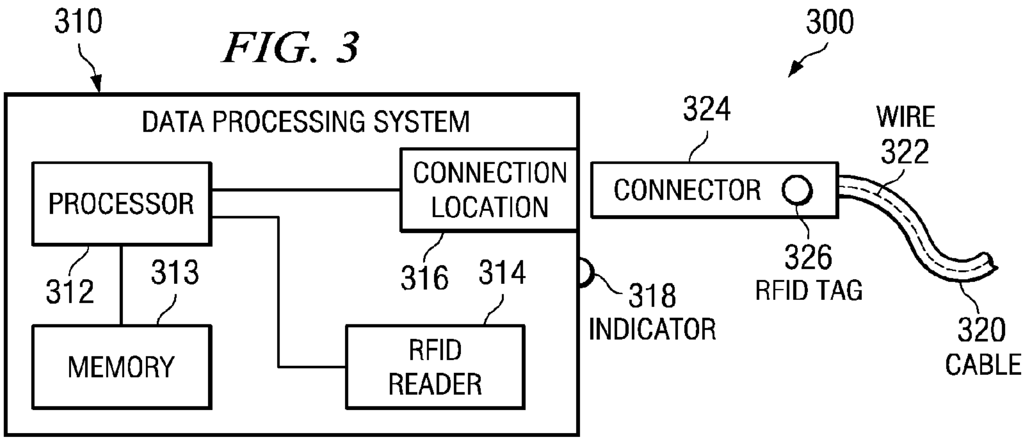
FIG. 3 illustrates a cable system, in accordance with an illustrative embodiment.

FIG. 3 illustrates a cable system, in accordance with an illustrative embodiment. Cable system 300 can be implemented in any system that includes a single cable and cable connection or a plurality of cables and cable connections. In the illustrative embodiment, cable system 300 includes data processing system 310 and cable 320.

Data processing system 310 is any device that couples to a single cable or to a number of cables. Data processing system 310 can be implemented as data processing system 100 of FIG. 1 or data processing system 200 of FIG. 2. In the illustrative embodiment, data processing system 310 is a computer and includes processor 312, memory 313, radio frequency identification (RFID) reader 314, connection location 316, and indicator 318.

Processor 312 is an example of processor unit 204 of FIG. 2. Processor 312 executes an instruction for matching a cable of interest with a particular connection location. In these examples, a cable of interest is a cable that is to be connected to a device, such as data processing system 310. Specifically, processor 312 identifies for a user the proper location for connecting a particular cable. In the illustrative embodiment, processor 312 executes the instructions for matching cable 320 with connection location 316.

Memory 313 connects to processor 312 and is a storage device that stores information on which connection location in data processing system 310 matches a specific cable of interest. Memory 313 can be implemented as persistent storage, such as persistent storage 208 of FIG. 2. Memory 313 can store data or information in any format, including but not limited to a table, a flat file, an Extensible Markup Language (XML) file, a relational database management system, or any combination thereof. In the illustrative embodiment, memory 313 stores the data that cable 320 connects to data processing system 310 through connection location 316 as entries in a table.

RFID reader 314 connects to processor 312 and is similar to RFID reader 220 of FIG. 2. In the illustrative embodiment, RFID reader 314 is a transceiver that both transmits and receives signals. An RFID system is a method for wirelessly transmitting, storing, and retrieving data using radio waves. Typically, an RFID system is used to automatically identify objects within certain proximities. RFID systems typically include a detector or reader, such as RFID reader 314, and a transponder or tag, such as RFID tag 326.

In the illustrative embodiment, RFID reader 314 can receive signals from an RFID tag that is in close proximity to RFID reader 314. Close proximity to is defined as anywhere between 0 and 36 inches radially from RFID reader 314. Radially is defined as any direction within a 360 degree circle around RFID reader 314. In the illustrative embodiment, RFID reader 314 receives data from cable 320 when cable 320 is within 24 inches of RFID reader 314.

Connection location 316 is a connector which mates with the end of a cable, such as cable 320. In the illustrative embodiment, connection location 316 is a jack or socket. However, connection location 316 can also be any other type of connection location, such as a port, an optical link, a wire clamp, a removable optical or electrical component cage, or an input/output (I/O) interface.

Indicator 318 is a visual mechanism to guide and notify a user in matching a specific cable with a specific connection location. In the illustrative embodiment, indicator 318 is a light emitting diode (LED) that notifies a user that cable 320 is to be plugged into connection location 316. In an alternative embodiment, indicator 318 can be any type of notification device, including but not limited to a display screen or an audible sound.

Cable 320 connects to data processing system 310. Cable 320 can be any type of cable, including but not limited to a keyboard, mouse, printer, power, I/O, or speaker cable. Cable 320 includes at least one wire 322, connector 324, and RFID tag 326. Depending on implementation, at least one wire 322 can be an electrically conductive material, or alternatively, at least one wire 322 can be an optically conductive fiber for optical communications, as known by one of ordinary skill in the art. At least one wire 322 may be a single wire or a bundle of wires bound together and is typically surrounded by a protective sheath. In use, at least one wire 322 transmits data or information to the devices to which cable 320 is connected. At least one wire 322 connects to connector 324.

Connector 324 mates with connection location 316. Connector 324 is the device for coupling cable 320 with data processing system 310. Typically, connector 324 is made from a rigid, plastic resin, such as a high density polymer. Connector 324 can be any type of connector, including but not limited to a Universal Serial Bus (USB), a Small Computer System Interface (SCSI), an Advanced Technology Attachment (ATA), a Serial ATA (SATA), a fiber channel, or an ethernet connector.

RFID tag 326 is a transponder, or a contactless data carrier, coupled to connector 324. RFID tag 326 can be implemented in any form, including but not limited to a label or a separate device. As a separate device, RFID tag 326 can be externally or internally connected to connector 324. In an alternative embodiment, RFID tag 326 can be embedded in or molded into connector 324. In yet another embodiment, RFID tag 326 can be connected to another part of cable 320, such as wire 322. In the illustrative embodiment, RFID tag 326 is a separate device embedded in connector 324.

In the illustrative embodiment, RFID tag 326 includes an integrated chip and antenna which transmit data in the form of a radio wave. The integrated chip includes a memory that stores a cable identification for cable 320. In the illustrative embodiment, RFID tag 326 is a passive tag that transmits a radio signal identifying cable 320.

In the illustrative embodiment, RFID tag 326 can be either passive or active. A passive tag does not require an internal power source but rather draws power from a reader, such as RFID reader 314, in order to transmit the information stored in the tag. An active tag, on the other hand, includes an internal power source which is used to generate power for an integrated chip to transmit the information stored in the tag. In the illustrative embodiment, RFID tag 326 is a passive tag that draws power from RFID reader 314. Thus, in use, the antenna in RFID reader 314 generates an electro-magnetic field. As RFID tag 326 passes through the electro-magnetic field, the electro-magnetic field induces an electrical current in the antenna of RFID tag 326. The induced current generates power for RFID tag 326 so that RFID tag 326 can transmit a cable identification for cable 320 to data processing system 310 via RFID reader 314.

In the illustrative embodiment, RFID tag 326 includes a memory for storing the cable identification for cable 320. In these examples, the cable identification is a hexadecimal value that identifies cable 320. The hexadecimal system is a numerical system that has a base of sixteen (16). A hexadecimal value can be a series of numbers or letters, or a combination of numbers and letters. Each series includes at least two characters and is typically written using the characters 0-9, A-F, or a-f.

In use, data processing system 310 translates the cable identification for cable 320 from a hexadecimal value to a binary value. A binary system is a numerical system that has a base of two (2) and represents data in a series of "0s" and "1s". For example, in the illustrative embodiment, if cable 320 has an assigned cable identification of "7D", then processor 312 would translate the hexadecimal value of "7D" into a binary value before executing an instruction using the cable identification. The binary equivalent for the number "7" is "0111", and the binary equivalent for the letter "D" is "1101". Therefore, the binary value for the hexadecimal value "7D" is "01111101".

The cable identification is not limited to the illustrative embodiment. One of ordinary skill in the art would recognize that other data storage configurations and other cable identification schemes may be used without deviating from the scope of the invention.

Additionally, the cable identification for cable 320 can also include information other than the assigned cable number. For example, such information can include the name of the device to which cable 320 is to be connected, the color of cable 320, or the number of the connection location to which cable 320 should connect.

In the illustrative embodiment, cable 320 is unique and only associated with data processing system 310. In other words, cable 320 can only be used with data processing system 310 and not with any other data processing system. Other data processing systems would not recognize the information stored in RFID tag 326 for cable 320, and would not, therefore, activate an indicator similar to indicator 318 to guide a user in identifying and connecting connector 324 with connection location 316.

In another embodiment, the cable identification for cable 320 is unique for the type of cable. For example, in this embodiment, if cable 320 is a power cable for data processing system 310, all power cables for data processing systems similar to data processing system 310 would also have the same cable identification. In another example for this embodiment, consider that cable 320 can be interchangeably used as a hard drive cable or a disk drive cable. If cable 320 is the hard drive cable, then cable 320 would have the same cable identification as the disk drive cable. Likewise, if cable 320 is the disk drive cable, then cable 320 would have the same cable identification as the hard drive cable.

In yet another embodiment, the cable identification for cable 320 is based on the connector type for connector 324. For example, if connector 324 is a Universal Serial Bus (USB) connector, then the cable identification for cable 320 is the same for all cables that include a Universal Serial Bus (USB) connector.

In still yet another embodiment, the cable identification for cable 320 is based on the number and type of connectors on cable 320. In this embodiment, cable 320 can include more than one connector that is similar to connector 324. For example, consider that cable 320 includes two connectors, with one connector designated to connect to the left speaker and the other designated to connect to the right speaker. Thus, the cable identification for cable 320 would be the same for all cables that include two connectors that connect to right and left speakers.

In use, a user presents a cable of interest that the user intends to connect to a device. In the illustrative embodiment, a user presents cable 320 to connect to data processing system 310. RFID reader 314 begins transmitting a radio frequency signal. When cable 320 is brought into close proximity with RFID reader 314, RFID tag 326 detects the radio frequency signal transmitted by RFID reader 314. The radio frequency signal induces an electrical current in RFID tag 326 and provides power to RFID tag 326. In response to receiving power, RFID tag 326 transmits a return signal. The return signal is a radio frequency signal that includes a cable identification for cable 320. RFID tag 326 transmits the signal to RFID reader 314. RFID reader 314 receives the signal and transmits the signal to processor 312. Processor 312 transforms the cable identification into a binary form and then reads the cable identification. Processor 312 then locates the same cable identification in a table stored in memory 313.

After locating the entry with the same cable identification in memory 313, processor 312 identifies the connection location for the cable identification. Specifically, in the illustrative embodiment, processor 312 determines that connection location 316 is the appropriate connection location for cable 320. Processor 312 then issues an instruction to activate indicator 318 to notify the user of the appropriate connection location for connecting cable 320. Since indicator 318 is a light emitting diode in the illustrative embodiment, the light emitting diode turns "on".

If processor 312 identifies more than one connection location for the cable identification, then processor 312 activates all indicators corresponding to the connection locations to which cable 320 can connect. If a last known good connection location is identified, then processor 312 activates intermittently the indicator associated with the last known good connection location. The last known good connection location is the last connection location with which cable 320 connected. Intermittently means to turn "on" and "off" in a cycle over a period of time. In the illustrative embodiment, since indicator 318 is a light emitting diode, processor 312 flashes or blinks indicator 318 for the last known good connection location.

If, on the other hand, the cable identification detected by RFID reader 314 does not match any entries in the table in memory 313, then no indicators are activated. In an alternate embodiment, a message to the user is given to indicate that no match was found. The message can be a text message on a screen, an audible sound, or another LED that indicates that no match was found.

After the user attaches connector 324 to connection location 316, processor 312 can automatically detect that the user attached connector 324 to connection location 316 or, alternatively, the user can verify in an input mechanism that connector 324 is connected to connection location 316. Example input mechanisms include a graphical user interface displayed on a screen, a keyboard entry, or a mouse click. Processor 312 then issues an instruction to deactivate indicator 318. If, however, processor 312 detects or receives an input that connector 324 is not connected to connection location 316, then processor 312 will not issue an instruction to deactivate indicator 318. Indicator 318 will remain activated until the user inputs an instruction to deactivate indicator 318. After receiving the instruction, indicator 318 then turns "off". If more than one indicator is activated because cable 320 can connect to multiple connection locations, then all the indicators for all the possible connection locations deactivate after receiving the instruction. If processor 312 receives an instruction that RFID reader 314 no longer detects RFID tag 326, then processor 312 will issue an instruction to deactivate indicator 318 and all other activated indicators.

If cable 320 includes more than one connector like connector 324, then indicator 318 only deactivates when the corresponding connector connects to the appropriate connection location. Once the corresponding connector connects, then the next indicator for the other connector activates until all connections are made.

In the illustrative embodiment, the data stored in memory 313 is created and saved in memory 313 as part of an initialization process for the data processing system. In one embodiment, the data in the memory is static and unchangeable by a user. However, in another embodiment, the data is dynamic and changeable by the user. In certain circumstances, a user may want to swap connection locations for a number of cables similar to cable 320. Thus, in such an embodiment, a user can add, delete, or modify the data in memory 313 using a user interface, such as a graphical user interface displayed on a display. The display is similar to video display terminal 104 of FIG. 1 or display 214 of FIG. 2. In another embodiment, data processing system 310 automatically updates the information in processor 312. Data processing system 310 can obtain the update either from a storage device externally connected to or networked to data processing system 310. Data processing system 310 can also obtain the information as the user physically connects cable 320 or another cable (not shown) into connection location 316 or another connection location (not shown). Data processing system 310 obtains the information by recognizing when either cable 320 or another cable connects to connection location 316 or another connection location. Data processing system 310 recognizes the connection by reading a sensor or some other sensing device at the connection location. In response to recognizing the connection, RFID reader 314 reads the cable identification from the RFID tag on the cable. RFID reader 314 then transmits the cable identification to processor 312. Processor 312 reads the cable identification and matches the cable identification with the recognized connection location. Processor 312 then saves the cable identification with the connection location as an additional entry into memory 313.

In one embodiment, the new entry is included with all the other data. In another embodiment, the new entry is identified as the last known good connection location or other similar identification. The last known good connection location identification allows users to store the most recent successful connection location. In this embodiment, the new connection location for a particular cable replaces any other connection locations recorded in memory 313. Thus, in this embodiment, the old connection location is deleted and the new connection location is written in the old connection location.

Additionally, in the illustrative embodiment, the user can move the data stored in memory 313 to another data processing system. If, for any reason, data processing system 310 needs to be replaced with a different data processing system, the matching cable and connection location information can be saved into memory 313 for use in the new data processing system. The location information in the new data processing system is used in the same way as the information in data processing system 310. Thus, in the illustrative embodiment, the processor for the other data processing system would match a connection location similar to connection location 316 with cable 320. Consequently, in response to the match, the other data processing system would activate an indicator similar to indicator 318 to notify the user of the appropriate connection location for cable 320.

The illustrative embodiment is not limited to the described example. For example, in another embodiment, RFID tag 326 can be an active tag. Furthermore, data processing system 310 and cable 320 can include more or fewer components. Moreover, cable system 300 can include a number of cables, similar to cable 320, to which data processing system 310 connects. In addition, cable system 300 is not limited to an RFID system and can also be implemented using any type of wireless technology, including but not limited to infrared, laser, sonic, Bluetooth®, or Wi-Fi®. (Bluetooth® is a trademark of Bluetooth SIG, Inc. in the United States, other countries, or both. Wi-Fi® is a registered trademark of the Wi-Fi Alliance in the United States, other countries, or both.)

Figure 4:
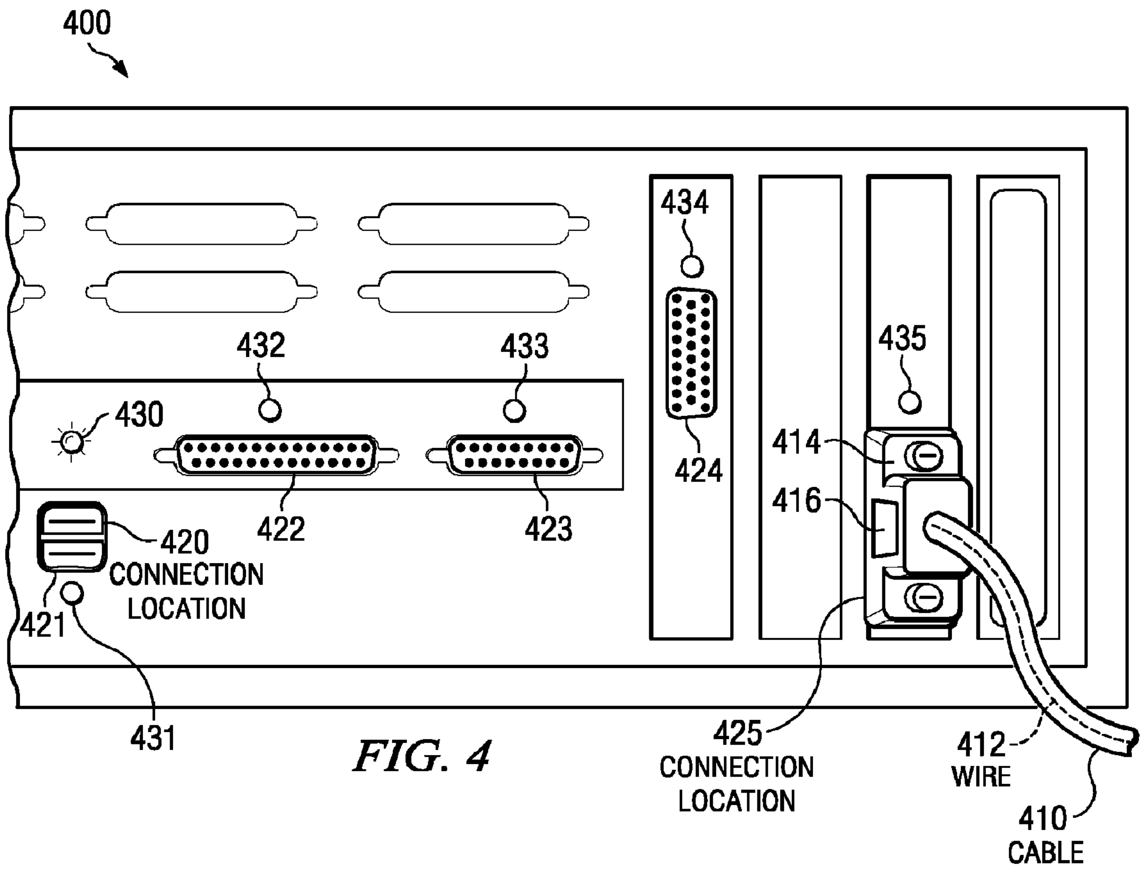
FIG. 4 illustrates a cable connection area for a data processing system, in accordance with an illustrative embodiment.

FIG. 4 illustrates a cable connection area for a data processing system, in accordance with an illustrative embodiment. Cable connection area 400 may be implemented on data processing system 100 of FIG. 1, data processing system 200 of FIG. 2, or data processing system 310 of FIG. 3. Cable connection area 400 is an example of any connection area on a device that connects to a single cable or a number of cables.

Cable connection area 400 includes cable 410, connection locations 420 through 425, and indicators 430 through 435. Cable 410 is similar to cable 320 of FIG. 3. In the illustrative embodiment, cable 410 includes wire 412, connector 414, and RFID tag 416. Cable 410 can be any type of cable. The type of cable is typically dependent on implementation.

Connection locations 420 through 425 are the possible locations to which a cable of interest can connect. In the illustrative embodiment, connection locations 420 through 425 include a connector that mates with a connector on a cable of interest. In the illustrative embodiment, connection locations 420 and 421 are USB ports. Connection location 422 is a parallel port connector. Connection location 423 is a serial port connector. Connection location 424 is a video graphics adapter connector. Connection location 425 is an ethernet connector.

Indicators 430 through 435 guide a user in locating the appropriate connection location for a cable of interest. Each indicator, 430 through 435, corresponds to a connection location, 420 through 425. Thus, indicator 430 corresponds to connection location 420, indicator 431 corresponds to connection location 421, and so on. In use, in response to receiving a signal from a cable of interest, one of the indicators 430 through 435 will activate. The activated indicator shows a user into which cable location to plug the cable of interest.

In the illustrative embodiment, each indicator 430 through 435 is disposed in a location close to connection locations 420 through 425, respectively. However, indicators 430 through 435 are not limited to the illustrated example. For example, in another embodiment, indicators 430 through 435 can be located in a single location with each indicator labeled with a connection location. In another example, indicators 430 through 435 can be disposed along one of the edges of cable connection area 400. In yet another embodiment, indicators 430 through 435 can be disposed within connection locations 420 through 425, respectively, so that connection locations 420 through 425 appear to "glow" when indicators 430 through 435 are activated.

In the illustrative embodiment, indicators 430 through 435 are light emitting diodes. However, in other embodiments, indicators 430 through 435 can be any other indicating form, including but not limited to a display screen or an audible sound. Furthermore, in another embodiment, indicators 430 through 435 can be graphically mapped on a separate display screen. The illustrative embodiments can also be combined so that more than one embodiment is implemented at one time.

In the illustrative embodiment, cable 410 connects to connection location 425. In the illustrative embodiment, indicator 435 is deactivated because cable 410 is already connected to connection location 425. On the other hand, in the illustrative embodiment, indicator 430 is activated. Therefore, in the illustrative embodiment, a signal from a cable of interest (not shown) has been received. In the illustrative embodiment, the cable identification for the cable of interest matches connection location 420. Therefore, indicator 430 is activated to notify the user that the cable of interest is to be connected to connection location 420.

The illustrative embodiments are not limited to the depicted example. More or fewer connection locations can be included in cable connection area 400. Additionally, the connection locations can be arranged in a different pattern and utilize different types and numbers of connectors for each connection location.

Figure 5:
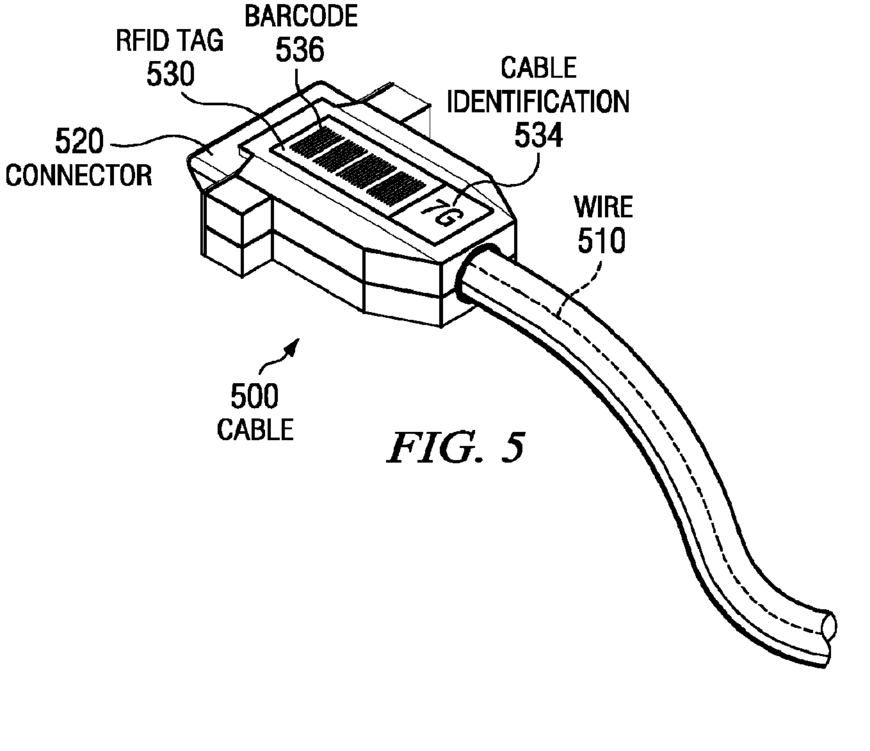
FIG. 5 illustrates a portion of a cable with an RFID tag, in accordance with an illustrative embodiment.

FIG. 5 illustrates a portion of a cable with an RFID tag, in accordance with an illustrative embodiment. Cable 500 is an example of a cable of interest that can be implemented as cable 320 of FIG. 3 or cable 410 of FIG. 4. Cable 500 includes wire 510, connector 520, and RFID tag 530. In the illustrative embodiment, wire 510 is a single wire or a bundle of wires surrounded by a protective sheath. Wire 510 is similar to wire 322 of FIG. 3 and wire 412 of FIG. 4. Wire 510 provides a connection between another device, such as a printer, and a data processing system, such as data processing system 100 of FIG. 1, data processing system 200 of FIG. 2, or data processing system 310 of FIG. 3. Wire 510 transmits data or information between the device and the data processing system.

Connector 520 mates with a connection location, such as connection location 316 of FIG. 3 or connection locations 420 through 425 of FIG. 4. Connector 520 is similar to connector 324 of FIG. 3 and connector 414 of FIG. 4. In the illustrative embodiment, connector 520 is a Small Computer System Interface (SCSI) connector.

RFID tag 530 is a transponder and is similar to RFID tag 326 of FIG. 3 and RFID tag 416 of FIG. 4. RFID tag 530 transmits a cable identification for cable 500 to a data processing system (not shown) using a radio wave. RFID tag 530 can be implemented in many forms, including but not limited to a label or a separate device. In the illustrative embodiment, RFID tag 530 is implemented as a label.

In the illustrative embodiment, RFID tag 530 can optionally include barcode 532 and cable identification 534. Barcode 532 and cable identification 534 are printed on RFID tag 530 and provide both a human-readable and machine-readable format for reading the cable identification for RFID tag 530. In use, when RFID tag 530 enters into the electromagnetic field generated by an RFID reader, the RFID tag 530 is electrically excited, and RFID tag 530 transmits cable identification 534. In the illustrative embodiment, cable identification 534 for cable 500 is "7G". Cable identification 534 is also encoded as barcode 532. Thus, the cable identification of "7G" is represented as both RFID cable identification 534, and as barcode 532 in the illustrative embodiment. In use, an RFID reader reads cable identification 534 of "7G" from RFID tag 530. Barcode 532 can be read using a standard barcode reader that is known in the art, and cable identification 534 can also be read visually by the user.

The illustrative embodiment is not limited to the depicted example. For example, cable 500 can include more or fewer components. Additionally, cable 500 can be a different type of cable and can include a different type of connector. Furthermore, in another embodiment, RFID tag 530 can be implemented in another form, such as a separate device instead of a label. Furthermore, in yet another embodiment, RFID tag 530 can be embedded in the housing of connector 520 at the time of manufacture.

Figures 6, 8:
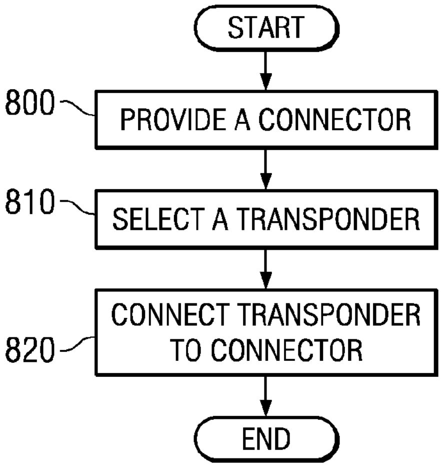
FIG. 6 is a cable management table, in accordance with an illustrative embodiment.
FIG. 8 illustrates a flowchart depicting the process of manufacturing a cable, in accordance with an illustrative embodiment.

FIG. 6 is a cable management table, in accordance with an illustrative embodiment. Cable management table 600 can be stored in a storage device, such as memory 313 of FIG. 3, for a data processing system, similar to data processing system 100 of FIG. 1, data processing system 200 of FIG. 2, or data processing system 310 of FIG. 3. In use, all entries in cable management table 600 will be represented as binary values instead of in the illustrated form. Cable management table 600 identifies a connection location for a cable of interest. Cable management table 600 also identifies the indicator associated with a particular connection location. The processor activates the indicator for the respective connection location in response to matching a cable of interest with the corresponding connection location.

Cable management table 600 includes cable identification column 610, connection location column 620, and indicator column 630. Cable identification column 610 lists all the cables which are to be connected in a data processing system. The cables listed in cable identification column 610 are similar to the cable identification for cable 320 of FIG. 3.

Connection location column 620 lists the location to which the cable listed in cable identification column 610 is to be connected. The connection locations listed in connection location column 620 are similar to connection location 316 of FIG. 3. In the illustrative embodiment, each connection location is identified as a device. However, in other embodiments, the connection location can be identified by the connection location number, the port number, or any other location mechanism for a data processing system.

Indicator column 630 lists the number of the indicator associated with connection location column 620. The indicators listed in indicator column 630 are similar to indicator 318 of FIG. 3. Each indicator is associated with a particular connection location listed in connection location column 620. The indicator identified in indicator column 630 can be any visual or audio indicator, such as a light emitting diode, a display screen, or an audible sound.

Each row in rows 640 through 650 associates a cable of interest with a connection location and an indicator. In the illustrative embodiment, cable "1F" in row 640 is to be connected to the "printer" connection location. Indicator "P2" is the indicator for the "printer" connection location. Therefore, in use, the processor activates indicator "P2" in response to a data processing system receiving a radio frequency signal from the cable of interest with an identification of "1F".

Row 642 associates a cable with cable identification number "2C" with the "speakers" connection location and indicator "S9". Row 644 associates a cable with cable identification number "4A" with the "mouse" connection location and indicator "M1". Row 646 associates the cable with cable identification number "4C" with the "keyboard" connection location and indicator "K3". Row 648 associates the cable with cable identification number "7D" with the "monitor" connection location and indicator "M4". Row 650 associates the cable with cable identification "3B" with the "power" connection location and indicator "P4".

In the illustrative embodiment, cable management table 600 is not organized in any particular order. Any new entry is added to the end of or subsequent to the last entry in cable management table 600. In another embodiment, cable management table 600 can be sorted in numerical and alphabetical order according to any column in cable management table 600. In this embodiment, any new entry is inserted into the appropriate location corresponding to the order for cable management table 600.

The illustrative embodiment is not limited to the depicted example. For example, cable management table 600 can include more or fewer columns or rows. Additionally, cable management table 600 can identify more connection locations in connection location column 620. Furthermore, cable management table 600 can list each entry in a different form, such as a number as opposed to the name of a device in connection location column 620. Although shown in table form this information may be located in other types of data structures in a storage device. For example, the information may be stored in a linked list or a database.

Figure 7:
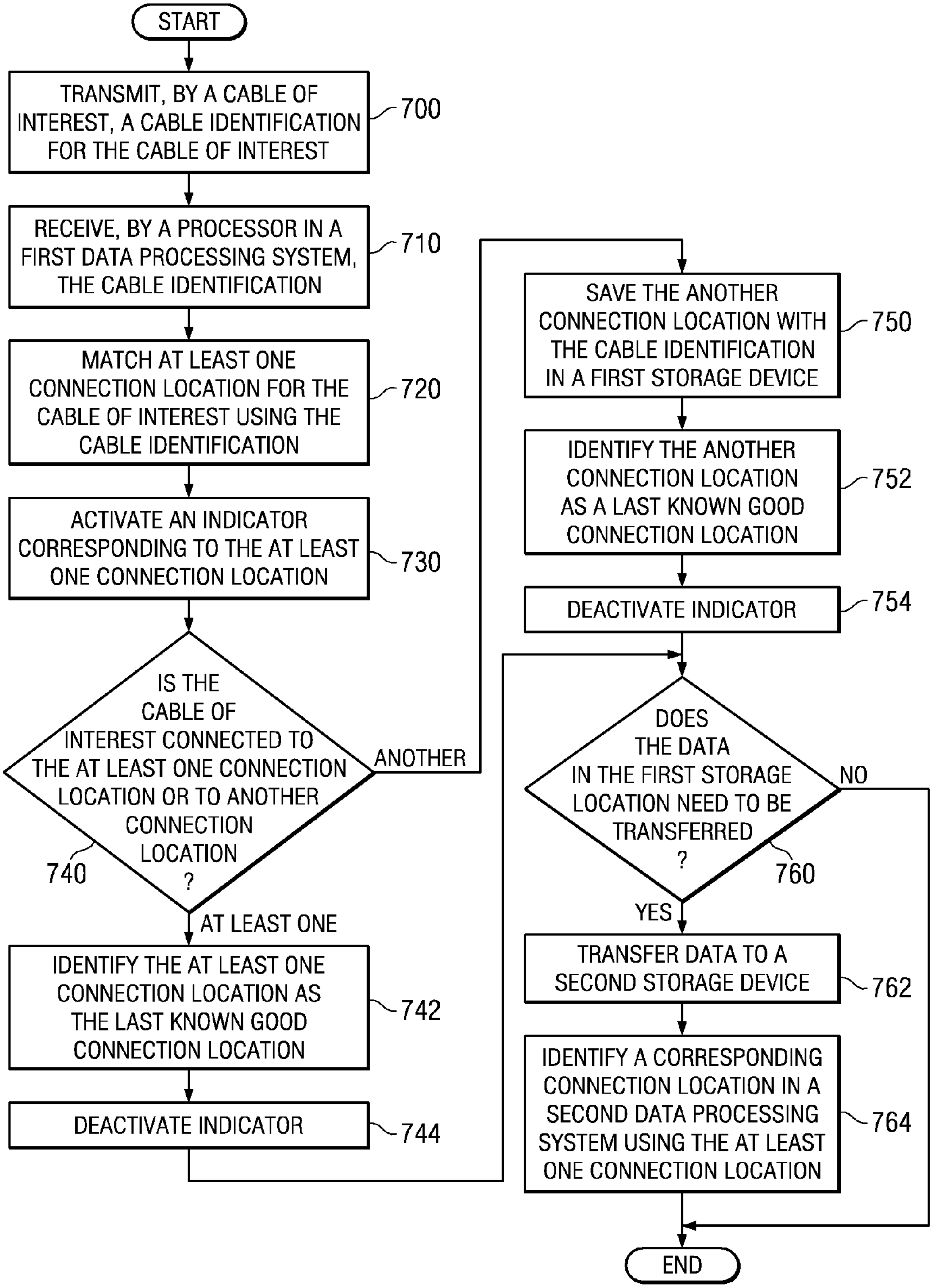
FIG. 7 illustrates a flowchart depicting the process of guiding a user in matching a cable of interest with a connection location, in accordance with an illustrative embodiment.

FIG. 7 illustrates a flowchart depicting the process of guiding a user in matching a cable of interest with a connection location, in accordance with an illustrative embodiment. The following process is exemplary only and the order of the steps may be interchanged without deviating from the scope of the invention. The process is executed in a cable management system, similar to cable system 300 of FIG. 3.

The process begins with a cable of interest transmitting a cable identification for the cable of interest (step 700). A processor in a first data processing system then receives the cable identification (step 710). The processor then matches at least one connection location for the cable of interest using the cable identification (step 720). The processor then activates an indicator corresponding to the at least one connection location (step 730). A determination is then made as to whether the cable of interest is connected to the at least one connection location or is connected to another connection location (step 740). If connected to the at least one connection location ("at least one" output to step 740), then the processor identifies the at least one connection location as the last known good connection location (step 742), and the processor deactivates the indicator for the at least one connection location (step 744).

Returning to step 740, if connected to another connection location ("another" output to step 740), then the processor saves the another connection location with the cable identification in a first storage device (step 750). The processor then identifies the another location as a last known good connection location (step 752). The processor then deactivates the indicator (step 754).

Returning to steps 744 and 754, a determination is then made as to whether the data in the first storage location needs to be transferred (step 760). If the data does not need to be transferred ("no" output to step 760), then the process terminates. Returning to step 760, if the data needs to be transferred ("yes" output to step 760), then the first data processing system transfers the data to a second storage device (step 762). The second storage device is located in a second data processing system. The second storage device then identifies a corresponding connection location in a second data processing system using the at least one connection location (step 764). The corresponding connection location is similar to the at least one connection location, except that the corresponding connection location is in the second data processing system instead of in the first data processing system. If a last known good connection location is identified, then the corresponding connection location is similar to the last known good connection location instead of the at least one connection location. The process terminates thereafter.

FIG. 8 illustrates a flowchart depicting the process of manufacturing a cable, in accordance with an illustrative embodiment. The following process is exemplary only and the order of the steps may be interchanged without deviating from the scope of the invention. The process is executed for a cable, similar to cable 320 of FIG. 3, cable 410 of FIG. 4, and cable 500 of FIG. 5.

The process begins with the manufacturing entity providing a connector (step 800). The connector is designed to mate with a connection location on a data processing system. The manufacturing entity then selects a transponder (step 810). The transponder stores a cable identification for the cable. The manufacturing entity then connects the transponder to the connector (step 820). When connecting, the transponder can be affixed externally to the connector or embedded internally within the connector. The process terminates thereafter.

The illustrative embodiments provide a cable management system, a computer program product, a cable, a method for manufacturing a cable, and a method for guiding a user in identifying a connection location for a cable of interest. A processor, in a data processing system, receives a cable identification from the cable of interest. The data processing system can be at least one of a computer, a system of computers, a network of computers, an audio-visual device, an audio-visual system, and a medical device. The processor then matches at least one connection location with the cable of interest based on the cable identification. In response to matching the at least one connection location with the cable of interest, the processor activates an indicator that identifies the connection location for connecting the cable of interest. In one embodiment, the indicator is a light emitting diode.

In another embodiment, the first storage device can transfer the at least one connection location to a second storage device in a second data processing system. The second storage device then identifies a corresponding connection location in the second data processing system. The corresponding connection location is a connection location similar to the at least one connection location.

The processor can identify the at least one connection location as a last known good connection location in response to the cable of interest being connected to the at least one connection location. The processor then saves the last known good connection location with the cable identification in a storage device.

The processor in the data processing system can also receive a signal that the cable of interest is connected to another connection location. In response to the cable of interest being connected to the another connection location, the processor identifies the another connection location as a last known good connection location. The processor then saves the last known good connection location with the cable identification in a first storage device for use at a later time.

In certain circumstances, the cable of interest matches with a number of connection locations. In such a situation, the processor for the data processing system activates all the indicators corresponding to all the connection locations with which the cable of interest can connect. However, the processor intermittently activates the indicator for the last known good connection location. Thus, if the indicator is a light emitting diode, the processor will make the indicator for the last known good connection location blink or flash intermittently.

In the illustrative embodiments, the cable of interest transmits a signal to the data processing system. The signal communicates the cable identification for the cable of interest. Additionally, the signal is typically a radio frequency signal. In one embodiment, a passive transponder coupled to the cable of interest transmits the radio frequency signal. In another embodiment, an active transponder coupled to the cable of interest transmits the radio frequency signal.

In an additional embodiment, the cable identification for the cable of interest also includes a device identification. The device identification associates the cable of interest with a specific device. In this embodiment, only the specific device recognizes the cable identification for the cable of interest. In another embodiment, the cable identification for the cable of interest is an identification of the type of cable. Examples of types of cables include a printer cable, a mouse cable, or a speaker cable. In yet another embodiment, the cable of interest can include a plurality of connectors. Each connector of the plurality of connectors connects to a corresponding connection location. Thus, each of the connectors in the plurality of connectors transmits a corresponding cable identification. The processor then activates a corresponding indicator for each of the connectors. The corresponding indicator identifies the connection location for each of the connectors. In another embodiment, the cable identification for the type of cable is provided, and all connectors supporting that device type are activated with the last known good connection location further identified.

The illustrative embodiments guide users in connecting a cable to the correct location. The illustrative embodiments can guide a user who is unfamiliar with the electronic system and a user who is very familiar with the electronic system but has a large number of cables to connect to a large number of electronic systems. In the illustrative embodiments, the user does need to employ a color coding system or a labeling system. The illustrative embodiments easily identify the location of the connection, even if the location is in an area that would ordinarily make reading a label difficult. Furthermore, the illustrative embodiments provide an automatic cable management system in which the cable locations can easily be modified whenever an electronic system is swapped or moved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A cable management system comprising:

a processor, in a first data processing system, that receives a cable identification for a cable of interest;

a first storage device coupled to the processor, wherein the first storage device stores a plurality of cable identifications and at least one connection location for each cable identification in the plurality of cable identifications;

an indicator coupled to the processor, wherein the processor activates the indicator in response to the processor matching the at least one connection location with the cable of interest using data in the storage device, and wherein the indicator identifies the at least one connection location for connecting the cable of interest, and wherein the processor identifies the at least one connection location as a last known good connection location in response to the cable of interest being connected to the at least one connection location, and wherein the processor saves the last known good connection location with the cable identification in the first storage device, and wherein the processor receives a signal that the cable of interest is connected to another connection location, and wherein the processor identifies the another connection location as a last known good connection location in response to the cable of interest being connected to the another connection location; and a second storage device in a second data processing system, wherein the first storage device transfers the at least one connection location to the second storage device, and wherein the second storage device identifies a corresponding connection location in the second data processing system using the at least one connection location.

2. The cable management system of claim 1, wherein the at least one connection location is a plurality of connection locations, and wherein each connection location in the plurality of connection locations corresponds to an indicator, and wherein an indicator for the last known good connection location activates intermittently.

3. The cable management system of claim 1 further comprising:

the cable of interest which transmits a signal to the data processing system, wherein the signal communicates the cable identification for the cable of interest.

4. The cable management system of claim 3, wherein the signal is a radio frequency signal, and wherein the cable management system further comprises:

a reader coupled to the processor, wherein the reader detects the radio frequency signal transmitted by the cable of interest; and a transponder coupled to the cable of interest, wherein the transponder stores the cable identification for the cable of interest, and wherein the transponder generates the radio frequency signal to transmit the radio frequency signal to the reader.

5. The cable management system of claim 4, wherein the transponder is one of a passive transponder or an active transponder.

6. The cable management system of claim 1, wherein the data processing system is at least one of a computer, a system of computers, a network of computers, an audio-visual device, an audio-visual system, and a medical device.

7. A computer program product stored on a computer usable storage medium including computer usable program code embodied thereon for directing a computer system to guide a user in identifying a connection location for a cable of interest, the computer program product comprising:

computer usable program code for receiving, by a processor in a first data processing system, a cable identification for the cable of interest;

computer usable program code for matching at least one connection location with the cable of interest based on the cable identification;

responsive to matching the cable of interest with the at least one connection location, computer usable program code for activating an indicator that identifies the at least one connection location for connecting the cable of interest, wherein the at least one connection location is stored in a first storage device;

responsive to the cable of interest being connected to the at least one connection location, computer usable program code for identifying the at least one connection location as a last known good connection location;

computer usable program code for saving the last known good connection location with the cable identification in the first storage device;

computer usable program code for receiving a signal that the cable of interest is connected to another connection location;

responsive to the cable of interest being connected to the another connection location, computer usable program code for identifying the another connection location as a last known good connection location; and computer usable program code for transferring the at least one connection location to a second storage device, wherein the second storage device uses the at least one connection location to identify a corresponding connection location in a second data processing system.

8. The computer program product of claim 7, wherein the at least one connection location is a plurality of connection locations, and wherein each connection location in the plurality of connection locations corresponds to an indicator, and wherein the computer program product further comprises:

computer usable program code for activating intermittently a corresponding indicator for the last known good connection location.

9. The computer program product of claim 7 further comprising:

computer usable program code for transmitting, by the cable of interest, a radio frequency signal to the data processing system, wherein the radio frequency signal communicates the cable identification for the cable of interest.

10. The computer program product of claim 9, wherein the radio frequency signal is transmitted by one of a passive transducer or an active transducer that is coupled to the cable of interest.

11. The computer program product of claim 7, wherein the cable identification comprises a device identification, wherein the device identification associates the cable of interest with a device, and wherein only the device recognizes the cable identification from the cable of interest.

12. The computer program product of claim 7, wherein the cable identification comprises an identification of the type of cable.

13. The computer program product of claim 7, wherein the cable of interest comprises a plurality of connectors, and wherein each connector in the plurality of connectors transmits a corresponding cable identification, and wherein the processor activates a corresponding indicator for the each connector, and wherein the corresponding indicator identifies the connection location for the each connector.

14. A cable comprising:

a connector designed to mate with a connection location on a first data processing system; and a transponder coupled to the connector, wherein the transponder stores the cable identification for the cable, and wherein the transponder transmits the cable identification to the first data processing system, and wherein the first data processing system matches at least one connection location with the cable based on the cable identification, and wherein the first data processing system activates at least one indicator that identifies the at least one connection location for connecting the cable in response to matching the cable with the at least one connection location, and wherein the at least one connection location is stored in a first storage device; and wherein the first data processing system identifies the at least one connection location as a last known good connection location in response to the cable being connected to the at least one connection location, and wherein the first data processing system saves the last known good connection location with the cable identification in the first storage device; and wherein the first data processing system receives a signal that the cable is connected to another connection location; and wherein the first data processing system identifies the another connection location as a last known good connection location in response to the cable being connected to the another connection location, and wherein the first data processing system transfers the at least one connection location to a second storage device, and wherein the second storage device uses the at least one connection location to identify a corresponding connection location in a second data processing system.

15. The cable of claim 14, wherein the transponder comprises:

an integrated chip that stores the cable identification for the cable; and an antenna coupled to the integrated chip, wherein the antenna transmits a radio frequency signal to the data processing system, and wherein the radio frequency signal includes the cable identification for the cable.

16. The cable of claim 14, wherein the transponder is a label, and wherein the cable identification is printed onto the transponder in the form of a barcode and in human-readable form.

17. A computer implemented method of manufacturing a cable, the computer implemented method comprising computer implemented steps for:

providing a connector to mate the cable with at least one connection location on a first data processing system;

selecting a transponder that stores a cable identification for the cable, wherein the step of selecting forms a selected transponder; and connecting the selected transponder to the connector, wherein the first data processing system receives the cable identification for the cable, and wherein the first data processing system matches at least one connection location with the cable based on the cable identification, and wherein the first data processing system activates at least one indicator that identifies the at least one connection location for connecting the cable in response to matching the cable with the at least one connection location, and wherein the at least one connection location is stored in a first storage device; and wherein the first data processing system identifies the at least one connection location as a last known good connection location in response to the cable being connected to the at least one connection location, and wherein the first data processing system saves the last known good connection location with the cable identification in the first storage device; and wherein the first data processing system receives a signal that the cable is connected to another connection location; and wherein the first data processing system identifies the another connection location as a last known good connection location in response to the cable being connected to the another connection location, and wherein the first data processing system transfers the at least one connection location to a second storage device, and wherein the second storage device uses the at least one connection location to identify a corresponding connection location in a second data processing system.

18. The computer implemented method of claim 17, wherein the step of connecting the selected transponder to the connector comprises one of affixing the transponder externally to the connector or embedding the transponder internally within the connector.

* * * * *